United States Patent
Maute

(10) Patent No.: US 6,302,817 B1
(45) Date of Patent: Oct. 16, 2001

(54) CHAIN GUIDE RAIL

(75) Inventor: Alexander Maute, Hechingen-Stetten (DE)

(73) Assignee: Joma-Polytec Kunststofftechnik GmbH, Bodelshausen (DE)

( * ) Notice: Subject to any disclaimer, the term of this patent is extended or adjusted under 35 U.S.C. 154(b) by 0 days.

(21) Appl. No.: 09/568,802

(22) Filed: May 11, 2000

(51) Int. Cl.$^7$ .............. B62J 13/00; F16D 1/00; F16D 57/02; B65G 21/00
(52) U.S. Cl. .......................... 474/144; 198/860.3
(58) Field of Search ............... 474/144, 146; 198/860.1, 860.3

(56) References Cited

U.S. PATENT DOCUMENTS

| | | | |
|---|---|---|---|
| 4,932,517 | 6/1990 | Johnson | 198/836.1 |
| 5,045,032 | 9/1991 | Suzuki et al. | 474/140 |
| 5,501,156 | * 3/1996 | Richter | 104/89 |
| 5,672,405 | 9/1997 | Plank, Jr. et al. | 428/133 |
| 6,129,202 | * 10/2000 | Layne et al. | 198/831 |

FOREIGN PATENT DOCUMENTS

| | | |
|---|---|---|
| C2-2431425 | 1/1976 | (DE) . |
| U1-81369697 | 4/1982 | (DE) . |
| C2-3525746 | 1/1987 | (DE) . |
| A1366170 | 5/1990 | (EP) . |
| 1183775 | 7/1959 | (FR) . |
| A1-9944921 | 9/1999 | (WO) . |

* cited by examiner

Primary Examiner—Sherry Estremsky
Assistant Examiner—Tisha D. Lewis

(57) ABSTRACT

The invention involves a chain guide rail for guiding a chain between two chain wheels, having a rail body made of plastic and a guide rail connected to it, which is also made of plastic, with a running groove to receive the chain.

11 Claims, 2 Drawing Sheets

CHAIN GUIDE RAIL

BACKGROUND OF THE INVENTION

This invention involves a chain guide rail for guiding a chain between two chain wheels, having a rail body made of resinous plastic and a guide rail connected to it, which is also made of plastic, with a running groove to receive the chain. In addition to its guide function, the chain guide rail can also function for tensioning or rerouting the chain. Rails of this type are especially necessary if chains do not run in straight lines between chain wheels, but instead must be deflected out of their straight-line progression, because, for example, structural components are in the way. This type of deflection of the chain can also result in an additional tensioning of the chain. Finally, rails of this type represent a simple possibility for guiding chains and can thus also help to prevent chains from jumping off of chain wheels.

In order to enable as easy and simple a gliding or sliding of a chain in a running groove of a rail as possible, and to keep frictional losses low, rails of this type are generally manufactured completely of plastic. The rail itself can be constructed in different ways. Thus, it can have a rectangular cross-section, whose width substantially corresponds to a width of the running groove. It can, however, also include only a narrow web which supports a guide rail that contains the running groove. The rail then has a cross-section in the form of a T or double T profile, with one of the cross-beams functioning as a guide rail. Reinforcement ribs can also be provided.

Use of rails of plastic has the disadvantage that the plastic is not able to handle high loads acting on the chain guide rail by the chain that slides on it. This is true particularly when the rail causes, in addition to having its guide function, also a deflection of the chain from of its normal running plane or tensions in the chain. A plastic rail can only support limited high forces and might be deformed—possibly to a breaking point—under an acting stress.

It is therefore also known to construct such a rail as a cast metal part and merely mount onto the cast part a plastic slide lining, which reduces frictional forces. Disadvantageous in this embodiment are the relatively high costs for the cast part. Furthermore, there is a problem of anchoring the slide lining permanently and securely to the metallic rail body at a reasonable price.

A purpose of the invention is therefore to provide a chain guide rail which can be manufactured in a cost effective manner and, nevertheless, can withstand high stresses of a chain that runs over it.

SUMMARY OF THE INVENTION

The invention achieves this purpose by providing a chain guide rail for guiding, deflecting, and tensioning chains between two chain wheels, with a rail body and a guide rail connected therewith being made of plastic and a sheet metal part being embedded in the rail body and/or the guide rail. An advantage thereof is that the rail, differently from known chain guide rails made of plastic, can handle a higher stress in terms of deformability and deflection, while, at the same time, good sliding properties are maintained. Furthermore, this design of a chain guide rail represents a more reasonably priced solution as opposed to a rail that is made from a casting, where two materials (metal and plastic) are connected to each other in a simple way, since the sheet metal part is placed into the plastic in such a way that it is surrounded by it at least partially. If the sheet metal part is completely surrounded by injection molding, and it is thus enclosed by plastic, this has the advantage that the sheet metal part is additionally protected in a simple way against corrosion. Thus, a lasting, stressable, form-fit connection results. The sheet metal part extends thereby over an entire length of the rail. As an alternative, the sheet metal part can be placed also only in sections the rail.

According to a first embodiment, it can be provided that the plastic of the rail body and/or the guide rail is injection molded about the sheet metal part, that is, the sheet metal part is "injected" into the plastic. By this, a secure connection, free from play, is ensured for both materials in a reasonably-priced manner.

Furthermore, it can be provided that the sheet metal part is a bent and/or stamped plate metal part. Bent sheet metal parts of this type are first punched out of larger metal sheets as stamped blank parts, and then bent into the desired shape. Stamping and bending are relatively cost-effective manufacturing processes. As an alternative, simple, stamped sheet metal parts that are not further processed by bending can also be used.

In addition, according to one embodiment, rail bodies and guide rails are connected integrally to each other, that is, they are formed as a single piece. This can be provided especially when they are made of the same plastic. However, even different plastics can be connected together so that their materials lock, that is, for example, are injected into each other in such a way that a single-piece connection occurs between the parts. Furthermore, however, other material-locking, form-fitting, or non-positive connection processes can be used.

In one embodiment, the bent sheet metal part has a V or a U-shaped cross-section. It is also conceivable, however, to have an L-shaped cross-section or even a simple rectangular cross-section. When a V-shaped or U-shaped cross-section is present, the bent sheet metal part can be bent in such a way that the free ends of the V-shaped or U-shaped bent sheet metal part are bent toward the outside at a right angle relative to a center axis of the bent sheet metal part, that is, away from the center axis. It can then be arranged in the rail body or the guide rail in such a way that the V-shaped or U-shaped part of the bent sheet metal part lies in -he rail body and the bent ends lie in the guide rail and extend therein in their lateral-extension direction and stabilize the guide rail in this direction. Conceivable, however, a U-shaped or V-shaped bent part could also be used whose ends are not bent over. U-shaped or V-shaped sheet metal parts are especially desirable for symmetrical rail designs which, for example, have a T or double-T shaped cross-section. In this regard, the shape of the sheet metal part can also be bent to such an extent, that a substantially T-shaped sheet metal part is produced.

In an L-shaped cross section of the bent sheet metal part, a long leg of the L-shaped bent sheet metal part can be arranged in the rail body and a short leg of the L-shaped bent sheet metal part can be arranged in the guide rail. This is especially practical if the chain guide rail is asymmetrical. That is, when it, for example, also has a substantially L-shaped cross-section.

Furthermore, a simple rectangular sheet metal part can also be used, which is not bent, but instead only punched out of a metal sheet and which then extends either within the guide rail and/or within the rail body. Depending on whether the sheet metal part is arranged upright or horizontally in the rail, it can extend into a transverse extension of the guide rail or alternatively, the sheet metal part can extend as well, or only, through the rail body, and reinforce it. In other words, the sheet metal part can also be arranged only in the rail body or the guide rail; however, it can also be embedded in both.

Furthermore, it can be provided that the sheet metal has openings and that the openings of the sheet metal parts are completely penetrated by plastic of the rail body and/or the guide rail. In this way, the connection between the parts is improved further, and thus also transmission of stress from the plastic of the running groove to the sheet metal part is further improved. The openings can be completely filled by plastic. However, some openings can also remain after the injection molding, with the sheet metal part, however, being completely enclosed by plastic in the area of the openings.

In order to affix the chain guide rail to a structural part, the rail body and the sheet metal part arranged in it can have bore holes or attachment components for affixing the rail to the structural part. Instead of putting bore holes into the rail, openings which remain after the injection molding can also be used for attachment.

Finally, it can be desirable that the heat expansion coefficient of the plastic of the rail body and/or the guide rail and the heat expansion coefficient of the sheet metal part are approximately equal, in order to prevent stress between the materials during heating of the structural part, for example, because of friction. This also applies when different plastics are used for the guide rails and rail bodies. For this purpose, for example, VERTON RF 700-12 EM (trade name) can be used, which, having a heat expansion coefficient of $1.5 \times 10^{-5}$ 1/K, is in the range of metals. In order to match the heat expansion coefficients of the plastic to that of the sheet metal, glass fibers, carbon fibers, or other fibers or materials, can be embedded, for example, into the plastic.

Additional embodiments of the invention are set forth in the patent claims as well as the other disclosure herein.

Possible embodiments of the invention are shown in the drawings, which are described in the following.

BRIEF DESCRIPTION OF THE DRAWINGS

Shown are, in schematic diagram.

DETAILED DESCRIPTION OF THE INVENTION

Figure 1:
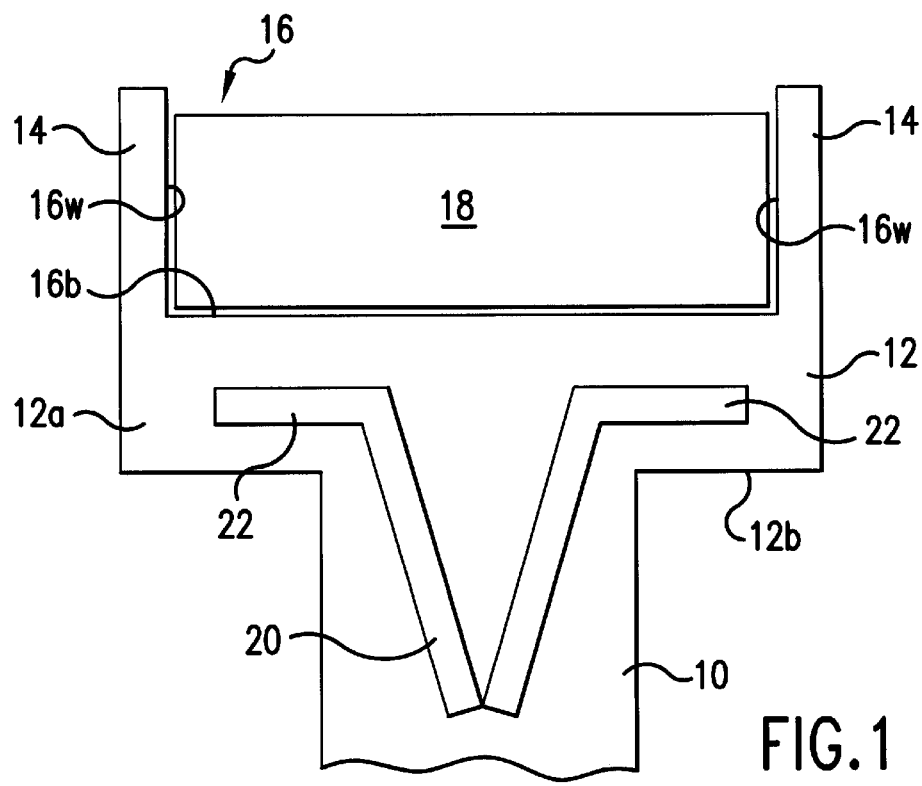
FIG. 1 is a sectional view through a first chain guide rail.

FIG. 1 shows a chain guide rail with a rail body 10, which is integrally connected to a guide rail 12. Rail body 10 and guide rail 12 are made of resinous plastic and are connected together as a single piece. The rail body 10 has a rectangular cross-section and the guide rail 12 has a U-shaped cross-section, with the guide rail 12 being arranged in cross-section centrally on the rail body 10, so that the chain guide rail has a T-shaped cross-section substantially over its entire length. The free legs 14 of the U-shaped guide rail 12 point away from the rail body 10 and form a running groove 16 between them. This means that rail body 10 and guide rail 12 are connected together in an area of a bottom 12b of the guide rail 12. A chain 18 is guided in the running groove 16, which slides on the plastic of surfaces 16b and 16w.

In order to improve the stability of the chain guide rail against loads acting on it, a bent sheet metal part 20 is inlaid in the guide rail 12 and the rail body 10, extending over an entire length of the chain guide rail. The bent sheet metal part 20 has a V-shaped cross-section, with free ends 22 of the V being bent (to the outside) perpendicularly from a central axis of the V, so that they run parallel to the bottom surface 16b of the running groove and lie in a base 12a of the guide rail 12 in order to reinforce the guide rail 12. The V-shaped portion of the bent sheet metal part 20 has its pointed tip in the rail body 10. This means that an open side of the V points toward an open side of the running groove 16.

The bent sheet metal part 20 is made of a punched-out and folded metal part, which has many openings (not shown). In order to manufacture the chain guide rail, the plastic of the rail body 10 and the guide rail 12 is injection molded around the bent sheet metal part 20, so that the plastic also gets into the openings and thus the bent sheet metal part 20 is form-fit connected in an especially secure manner with the plastic material. The sheet metal part 20 is thus completely surrounded by plastic and thus protected from corrosion.

The symmetrical design of the chain guide rail, as is shown in FIG. 1, has the advantage that especially high forces can be received, without resulting in deformation of the rail.

Figure 2:
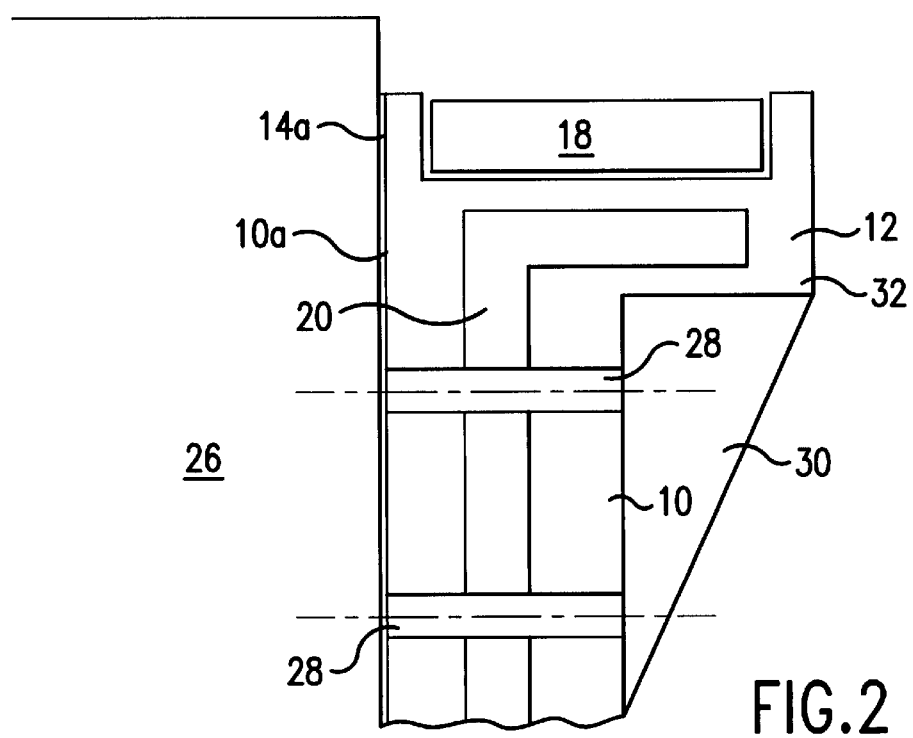
FIG. 2 is an alternative embodiment of a chain guide rail.

FIG. 2, on the other hand, shows an asymmetrical chain guide rail, which by comparison has the advantage that it can be attached on one side especially well and can thus be supported against a fixed structural part 26. The rail body 10 has, in turn, here a rectangular cross-section. The U-shaped guide rail 12 is, however, not arranged centrally on the rail body 10, but instead is arranged in such a manner that an outside 14a of one free leg 14 of the U coincides in an aligned manner with an outside 10a of the rail body 10. The chain guide rail thus has an upside down L cross-section. The embedded injection-molded bent sheet metal part 20 also has an L-shaped cross-section, with a long leg of the L being arranged in the rail body 10 and a short leg of the L being arranged in the guide rail 12. The rail body 10 and the bent sheet metal part 20 arranged in it have aligned bore holes or openings 28 through them, which allow the chain guide rail to be screwed onto the structural part 26. In order to increase stability and prevent a buckling of the guide rail 12 during high stresses, reinforcement ribs 30 are applied, which extend between the guide rail 12 and the rail body 10. The reinforcement ribs 30 thus extend from the rail body 10 to an outer free end 32 of the guide rail 12.

Figure 3:
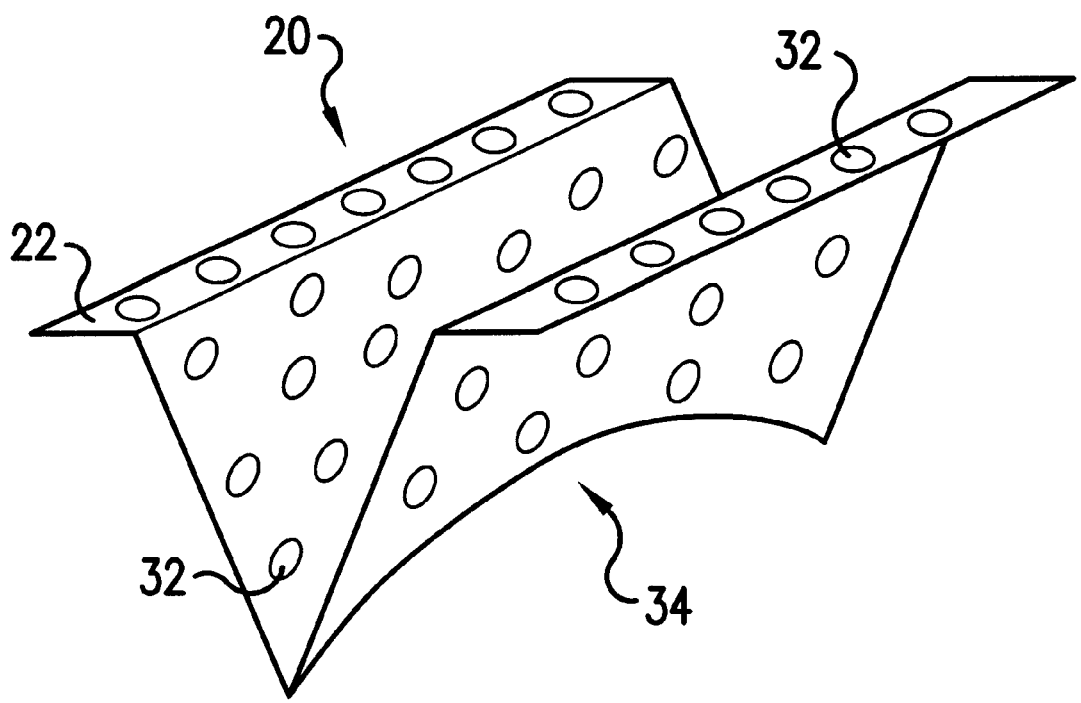
FIG. 3 is a bent sheet metal part to be placed into a chain guide rail.

FIG. 3 shows a bent sheet metal part 20 in a schematic, perspective, representation, where it can be recognized that the bent sheet metal part 20 has many openings 32, which are penetrated with plastic during injection molding. The bent sheet metal part 20 has a concave recess 34 at the tip of the V-shape along the direction of its longitudinal extension, which reaches toward he open end of the V and is generated by an elliptical punch-out from the sheet metal blank. The two sides of the V-shaped bent sheet metal part, in the longitudinal direction, are thus connected together only at their two ends. Through this design, an especially good connection to the plastic, along with a simultaneously high force-receiving capability, is ensured.

The invention claimed is:

1. Chain guide rail for guiding a chain (18) between two chain wheels, having a rail body (10) and a connected guide rail (12), both made of plastic, with the guide rail (12) having a running groove (16) to receive the chain (18), characterized in that a sheet metal part (20) is embedded in the rail body (10) and/or the guide rail (12), wherein the bent sheet metal part (20) has a V-shaped cross-section.

2. Chain guide rail according to claim 1, characterized in that plastic of the rail body (10) and/or the guide rail (12) are injection molded at least partially about the sheet metal part (20).

3. Chain guide rail according to claim 1, characterized in that the rail body (10) and the guide rail (12) are formed together as a single piece.

4. Chain guide rail according to claim 1, characterized in that the chain guide rail has a symmetrical or asymmetrical cross-section.

5. Chain guide rail according to claim 1, characterized in that the sheet metal part (20) is a bent sheet metal part and/or a stamped sheet metal part.

6. Chain guide rail according to claim 1, characterized in that free ends (22) of the V-shaped bent sheet metal part (20) are bent away to the outside at a right angle relative to a center axis of the bent sheet metal part (20).

7. Chain guide rail according to claim 1, characterized in that the sheet metal part (20) has openings (28, 32) and the openings (28, 32) are completely gripped through by plastic of the rail body (10) and/or the guide rail (12).

8. Chain guide rail according to claim 1, characterized in that the rail body (10) and the sheet metal part (20) arranged in it have bore holes (28) and/or attachment elements for mounting the rail to a structural part (26).

9. Chain guide rail according to claim 1, characterized in that a heat expansion coefficient of plastic of the rail body (10) and/or the guide rail (12) and a heat expansion coefficient of the sheet metal (20) are approximately equal.

10. Chain guide rail according to claim 1, characterized in that glass fibers, carbon fibers, or other fibers are integrated into the plastic.

11. Chain guide rail according to claim 6 characterized in that the V-shaped part of the bent sheet metal part (20) is arranged in the rail body (10) and the bent ends (22) are arranged in the guide rail (12).

* * * * *